F. E. PAYNE.
METHOD OF MANUFACTURING PACKING.
APPLICATION FILED NOV. 17, 1917.
1,325,955. Patented Dec. 23, 1919.
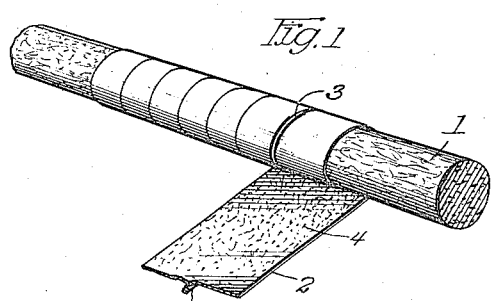
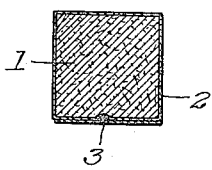
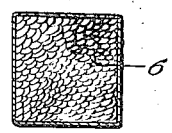
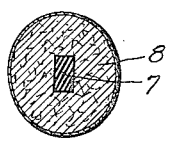
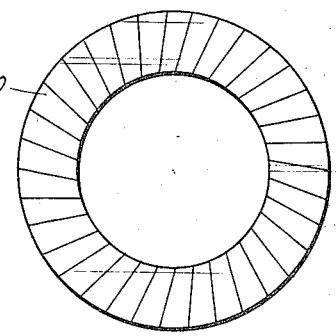
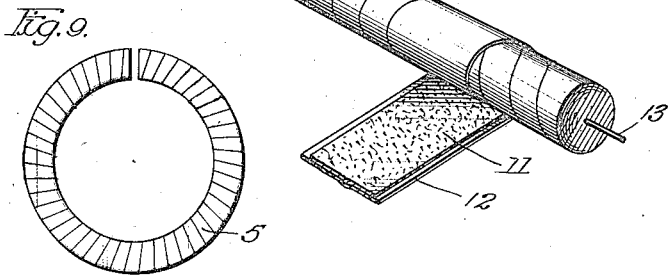
Witnesses:
Robert H. Weir
Arthur W. Carlson
Inventor:
Frank E. Payne.
By George Bayard Jones
Atty.

UNITED STATES PATENT OFFICE.

FRANK E. PAYNE, OF CHICAGO, ILLINOIS, ASSIGNOR TO CRANE PACKING COMPANY, OF CHICAGO, ILLINOIS, A CORPORATION OF ILLINOIS.

METHOD OF MANUFACTURING PACKING.

1,325,955.   Specification of Letters Patent.   Patented Dec. 23, 1919.

Application filed November 17, 1917. Serial No. 202,574.

*To all whom it may concern:*

Be it known that I, FRANK E. PAYNE, a citizen of the United States, residing at Chicago, in the county of Cook and State of Illinois, have invented a certain new and useful Improvement in Methods of Manufacturing Packing, of which the following is a full, concise, and exact description.

My invention relates to improvements in packing, such as is used to prevent leakage of steam, water, oil, or any other gases, vapors or fluids.

The general object of my invention is to provide a packing adapted to prevent such leakage even under high temperature conditions.

Other objects may be inferred from the following description taken in conjunction with the accompanying drawings in which I have illustrated several embodiments of the invention. It is to be understood that the invention may be embodied in other forms.

Figure 1 is a perspective view showing the manner in which the packing is wound.

Fig. 2 is an enlarged section of the completed product.

Figs. 3 and 4 are similar sections of modified products.

Fig. 5 is an enlarged plan view of part of a square gasket.

Fig. 6 is a section thereof.

Fig. 7 is a plan view of a circular gasket.

Fig. 8 is a perspective view illustrating the method of winding a further form of packing, and Fig. 9 is a plan view of a finished length of packing.

In manufacturing the first form of packing illustrated, suitable means are provided for rotating the core 1, which consists preferably of asbestos or other heat resistant material. The heat resisting material may be in the form of a rope or rolled tape, or it may be braided, and may be lubricated, that is, the spaces between the strands or fibers may contain graphite or other lubricating material. As said core is rotated, a strip of thin metal foil 2 is wound thereon. Although it is more convenient to feed the strip onto the rotating core, the operation may be reversed by rotating the strip around a stationary core. Said foil consists preferably of copper, although it may be of other metal sufficiently soft to prevent abrasion of piston rods or other moving parts with which it may come in contact. The strength of copper foil of certain thickness is sufficient to enable the copper to be wound on tightly thereby armoring and reinforcing the asbestos core without rendering it too stiff to enable the finished length to be bent or curved in any desired manner. Where very thin copper foil is used, it is desirable to reinforce it with a tension member 3 which may consist of a string. Such tension member enables the foil to be wrapped tightly about the core without danger of tearing it during the wrapping operation. A suitable lubricant, such as graphite 4, may be applied to the foil as it is being wound on the core, although under some conditions such lubricant is not necessary.

After the packing has been wound in the manner described, it is pressed to any desired cross section in suitable dies or rollers. For example, it may be pressed to a rectangular cross section as shown in Fig. 2 so that it may be more conveniently fitted into a stuffing box, for example. In Fig. 9 a completed length of packing 5 is shown bent into circular form.

The packing described is particularly adapted for use in locations where it is exposed to superheated steam and has been used with even higher temperatures. Asbestos alone is mechanically weak and is such a loose fabric that fluid pressure is transmitted through it, resulting in leakage. However, the spiral copper or other metal strip reinforces the asbestos and renders it impervious to fluid pressure. The packing after being compressed exhibits some tendency to expand so that if it is still in contact with a piston rod which is slightly out of alinement, this property permits it to maintain a tight joint against the rod despite such slight irregularities in its movement. Said packing is also flexible and fireproof.

Where resistance to excessively high temperature is not so important, the core may be made of any other suitable compressible or expansible material, such as flax, rubber, canvas, hemp, jute or cotton. Such packing is illustrated in Fig. 3 in which the core 6 may be assumed to be any of the fibrous materials mentioned or any suitable equivalent therefor. In Fig. 4 a central core 7 of rubber is provided, which is surrounded by a further core of asbestos 8 or of any of the materials previously mentioned or any suitable equivalent thereof, the packing being reinforced and armored by metal foil as in the previous instances. The rubber core may be of any desired cross-sectional outline and permits of a greater degree of expansion after the packing has been compressed.

In Figs. 5 and 6 I have illustrated a portion of a square gasket consisting of a flat strip of asbestos 9, or other heat resisting material, surrounded by an armor of metal foil 10, which metal foil may consist of copper or other metals depending on whether the gasket is to be subjected to high temperatures. Fig. 7 shows a circular gasket of similar construction.

In Fig. 8 the packing is formed by winding asbestos 11 and copper 12, or equivalent materials, onto a suitable core 13. The core may consist of a string or other tension member, the copper and the super-imposed asbestos being wound back and forth in spiral turns until the desired diameter is obtained. The asbestos may be in the form of a flattened rope or it may be braided or in the form of tape.

When asbestos is used as the body of the packing, the latter has been able to withstand a temperature so high that the metal parts adjacent to the packing have been nearly red hot. It is, therefore, well adapted for use in connection with exhaust gases or products of combustion from an internal combustion engine.

The invention is not to be limited to the particular embodiments thereof described and illustrated, as I desire to cover such additional forms thereof as fall within the scope of the appended claims.

Having thus described my invention, what I claim as new and desire to secure by Letters Patent of the United States is:—

1. A packing comprising a core of heat resistant fabric and an armor of metal foil wound spirally thereon to reinforce said fabric and to provide a wearing surface therefor.

2. A packing comprising a compressible core of heat resistant material, an armor of metal foil wound spirally thereon to provide a wearing surface, and a tension member interposed between successive turns of said foil.

3. A packing comprising an asbestos core, a spiral copper reinforcement therefor and lubricating means on the surface of the copper.

4. A packing comprising an asbestos core, and a spiral copper reinforcement therefor, said asbestos enabling said packing to withstand extremely high temperatures and said copper reinforcement constituting a metallic wearing surface for said packing.

5. A packing comprising asbestos and a plurality of layers of copper foil, said asbestos constituting the bulk of the packing and said copper serving to render it impervious to fluid pressure, to strengthen it mechanically and to provide a metal wearing surface.

6. As a new article of manufacture, a packing comprising a ring of heat resistant material reinforced mechanically and rendered impervious to fluid pressure by metal foil.

7. A packing comprising an asbestos core, a reinforcing sheath therefor consisting of a copper strip wound back and forth spirally on the core, graphite between the adjacent turns of the copper and a tension member also wound on with the copper to insure compact winding.

8. The method of manufacturing packing which consists in winding a strip of copper foil and a string tension member about an asbestos core and applying a lubricant to said copper as it is being wound onto said core.

In witness whereof, I hereunto subscribe my name this 13th day of November A. D., 1917.

FRANK E. PAYNE.